(12) United States Patent
Rai et al.

(10) Patent No.: US 8,817,695 B1
(45) Date of Patent: Aug. 26, 2014

(54) DYNAMIC ADJUSTMENT OF REVERSE LINK ACK TRANSMISSION POWER BASED ON FORWARD LINK SLOT UTILIZATION

(75) Inventors: Deveshkumar Rai, Overland Park, KS (US); Maulik K. Shah, Overland Park, KS (US); Jasinder P. Singh, Olathe, KS (US); Sachin R. Vargantwar, Macon, GA (US)

(73) Assignee: Sprint Spectrum L.P., Overland Park, KS (US)

( * ) Notice: Subject to any disclaimer, the term of this patent is extended or adjusted under 35 U.S.C. 154(b) by 257 days.

(21) Appl. No.: 13/463,310

(22) Filed: May 3, 2012

(51) Int. Cl.
*H04W 52/48* (2009.01)
(52) U.S. Cl.
CPC ..................... *H04W 52/48* (2013.01)
USPC .............. 370/318; 370/235; 714/18; 714/748
(58) Field of Classification Search
USPC ............. 370/235, 236, 318; 714/18, 748–751
See application file for complete search history.

(56) References Cited

U.S. PATENT DOCUMENTS

| 7,035,214 | B1 | 4/2006 | Seddigh et al. |
| 7,359,365 | B2 | 4/2008 | Qian et al. |
| 7,813,323 | B1 | 10/2010 | Talley et al. |
| 8,160,034 | B1* | 4/2012 | Sarkar et al. .................. 370/336 |
| 2004/0097253 | A1* | 5/2004 | Malkamaki ..................... 455/522 |
| 2006/0045010 | A1 | 3/2006 | Baker et al. |
| 2010/0150069 | A1* | 6/2010 | Fang et al. ..................... 370/328 |
| 2013/0201857 | A1* | 8/2013 | Bhargava et al. ............. 370/252 |

FOREIGN PATENT DOCUMENTS

EP 1 326 361 12/2002

OTHER PUBLICATIONS

H. Yu, et al., "A highly efficient, low delay architecture for transporting H.264 video over wireless channel," Elsevier, Signal Processing: image communication 19 (2004) 369-385.

* cited by examiner

*Primary Examiner* — Hoon J Chung

(57) ABSTRACT

A method and system for dynamically adjusting reverse-link ACK transmission power based on forward-link timeslot utilization. A radio access network (e.g., a base station) may monitor timeslot utilization on the forward link and, upon detecting that the timeslot utilization is threshold high, may cause one or more served access terminals to increase their ACK transmission power, thereby possibly helping to minimize re-transmissions for data packets that have already been successfully received, and thus helping to minimize unnecessary use of potentially scarce forward-link timeslots.

20 Claims, 8 Drawing Sheets

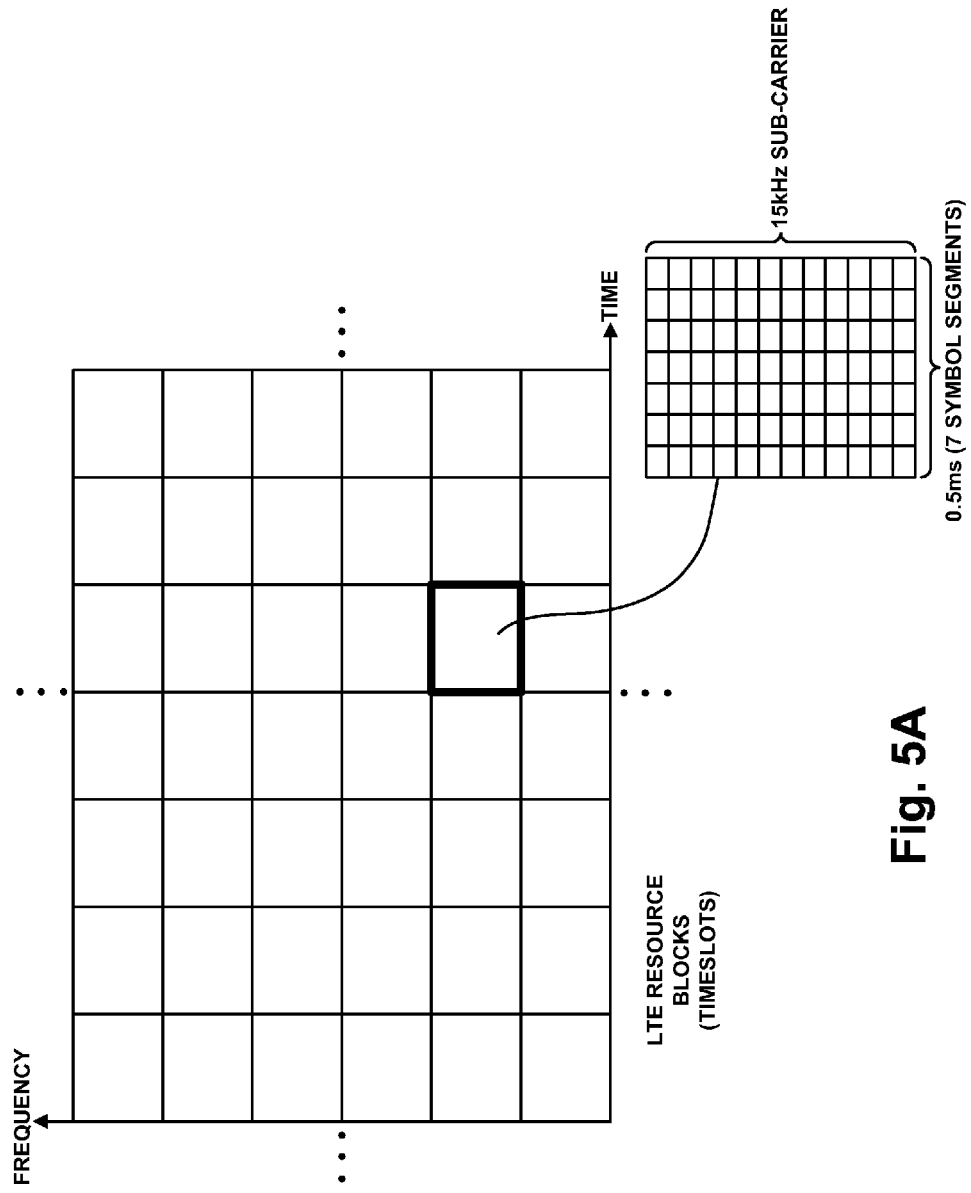

DYNAMIC ADJUSTMENT OF REVERSE LINK ACK TRANSMISSION POWER BASED ON FORWARD LINK SLOT UTILIZATION

BACKGROUND

Unless otherwise indicated herein, the materials described in this section are not prior art to the claims and are not admitted to be prior art by inclusion in this section.

In a typical cellular wireless communication system, the air interface between a base station and served access terminals may define a forward-link (or "downlink") for carrying communications from the base station to the access terminals and a reverse-link (or "uplink") for carrying communications from the access terminals to the base station. In various implementations, these links may be defined on or more carrier frequencies or blocks of frequencies. Furthermore, on each link, various channels may be defined through techniques such as time division multiplexing, code division multiplexing, and the like.

In one implementation, the forward-link may be divided over time into a sequence of timeslots, and the base station or associated equipment may be arranged to transmit data, such as bearer traffic (e.g., user data) and control signaling (e.g., paging and other overhead messages), to access terminals in those timeslots. In such an implementation, the base station or associated equipment may dynamically schedule transmission of data in particular timeslots and may then transmit the data according to that schedule.

To help overcome errors that may arise in wireless data transmission, the base station and served access terminals may also be arranged to apply a hybrid automatic repeat request (hybrid-ARQ or HARQ) process. In such a process, when the base station is going to transmit a data packet to an access terminal, the base station may repeatedly attempt transmission of the packet to the access terminal in sequential (e.g., interlaced) timeslots, adding more error correction coding with each subsequent attempt and/or transmitting various portions of the packet with various error correction coding in each subsequent attempt, in an effort to have the access terminal ultimately receive enough data to constitute or facilitate uncovering the packet as a whole.

By way of example, if the packet payload comprises the elements ABCD, the base station may transmit in a first timeslot the full payload ABCD plus some error correction coding. If that transmission is insufficient to allow the access terminal to uncover the payload, the base station may then transmit in a next timeslot a portion of the payload, such as ABC, plus some additional error correction coding. And if that transmission is still insufficient, the base station may then transmit in a next timeslot another portion of the payload, such as BDC, plus more substantial error correction coding. This process may continue until the packet transmission is deemed successful or until a predefined threshold number of timeslots is exhausted (in which case the transmission would have failed).

During this packet transmission process, for each transmission attempt that does not result in the access terminal having successfully received or uncovered the complete packet payload, the access terminal may transmit to the base station on the reverse-link a negative acknowledgement (NAK), to prompt the access network to engage in a next transmission attempt. On the other hand, once the access terminal has received or uncovered the complete packet (i.e., the packet transmission was successful), the access terminal may transmit to the base station a positive acknowledgement (ACK), to inform the base station that transmission of the packet was successful, thereby completing transmission of that packet.

OVERVIEW

An issue that can arise in hybrid-ARQ process such as this is that, when the access terminal transmits an ACK to indicate that the packet transmission was successful, poor RF conditions on the reverse-link may prevent that ACK from successfully arriving at the base station. As a result, after waiting a threshold period of time for an ACK or NAK after a given transmission attempt, the base station may presume that the transmission was still not successful (akin to receiving a NAK), and the base station may responsively engage in a next transmission attempt for the packet, notwithstanding the fact that transmission was already successful.

Unfortunately, such unnecessary re-transmissions can waste potentially scarce timeslots on the forward-link, and particularly timeslots that could be used for other purposes such as for transmissions of additional data packets to the access terminal or to other access terminals. In practice, this may result in overall reduced throughput on the forward-link, and consequently diminished user experience.

Disclosed herein is a method and corresponding system to help manage this issue. In accordance with the method, a radio access network (RAN) may monitor the extent to which timeslots on the forward link are utilized, such as the proportion of forward-link timeslots that have recently carried data and/or the proportion of forward-link timeslots that are scheduled to carry data, and when the RAN determines that the timeslot utilization is high, the RAN may cause one or more access terminals to increase the power at which they transmit ACKs to the RAN on the reverse link. By increasing the ACK transmission power on the reverse link in response to high forward-link timeslot utilization, the RAN may help to ensure its successful receipt of ACK transmissions and thus help to avoid unnecessary use of the scarce forward-link timeslots.

In this process, the increase in ACK transmission power on the reverse-link may be an increase from a first ACK transmission power to a second, higher ACK transmission power. Further, increasing the power at which an access terminal transmits ACKs to the RAN may result in the access terminal transmitting ACKs at a higher power level than the access terminal uses for transmission of NAKs. In practice, for instance, if the access terminal has a default reverse-link transmission power level (e.g., set through a power-control process), the access terminal may increase its ACK transmission power from that level and may maintain its NAK transmission power at the default level. Alternatively, the access terminal may increase its ACK transmission power and may reduce the NAK transmission power, particularly if the RAN determines not only that the forward-link timeslot utilization is threshold high but also that the reverse-link radio frequency (RF) conditions are threshold poor (e.g., reverse-link noise is threshold high).

Accordingly, in one respect, disclosed is a method that may be carried out in a wireless communication system in which a RAN serves an access terminal over an air interface that defines a forward-link having timeslots that carry data packets from the RAN to the access terminal and a reverse-link that carries hybrid-ARQ messaging from the access terminal to the RAN. In line with the discussion above, the hybrid-ARQ messaging may include NAKs and ACKs for forward-link data packet transmission attempts.

In accordance with the method, the RAN may make a determination that utilization of the timeslots on the forward-link is threshold high, and in response to at least that determination, the RAN may then cause the access terminal to transition from (i) a first mode in which the access terminal transmits the NAKs and ACKs at the same power level to (ii) a second mode in which the access terminal transmits the ACKs at a higher power level than the NAKs. For instance, the RAN may cause the access terminal to increase the power at which the access terminal transmits ACKs and to either maintain at a default level or decrease the power at which the access terminal transmits NAKs. By increasing the power at which the access terminal transmits ACKs, the RAN may increase the likelihood that the RAN will successfully receive those ACKs may thereby reduce the risk of engaging in unnecessary re-transmission attempts that may waste valuable forward-link timeslots.

In another respect, disclosed is a method that may involve (i) a RAN serving access terminals over an air interface having a forward-link for carrying communications from the RAN to the access terminals and a reverse-link for carrying communications from the access terminals to the RAN, (ii) the RAN making a determination that timeslot utilization on the forward-link is threshold high, and (iii) responsive to at least that determination, the RAN causing the access terminals to increase transmission power at which the access terminals transmit ACKs on the reverse-link for data packet transmission attempts on the forward-link, while the access terminals maintain at a default level or reduce transmission power at which the access terminals transmit NAKs on the reverse-link for data packet transmission attempts on the forward-link.

Still further, in another respect, disclosed is a radio access system that includes a base station and a controller (possibly part of the base station). The base station may be arranged to communicate with access terminals over an air interface defining a forward-link for communications from the base station to the access terminals and a reverse link for communications from the access terminals to the base station. The controller may then be arranged to make a determination that timeslot utilization on the forward-link is threshold high and, responsive to at least that determination, to cause the base station to transmit to the access terminals a control signal that causes the access terminals to increase transmission power at which the access terminals transmit ACKs on the reverse-link to the base station for data packet transmission attempts from the base station, while the access terminals reduce or maintain at a default level transmission power at which the access terminals transmit NAKs on the reverse link to the base station for data packet transmission attempts from the base station.

These as well as other aspects, advantages, and alternatives will become apparent to those of ordinary skill in the art by reading the following detailed description, with reference where appropriate to the accompanying drawings. Further, it should be understood that the description provided in this overview section and elsewhere in this document is provided by way of example only.

DETAILED DESCRIPTION

Figure 1:
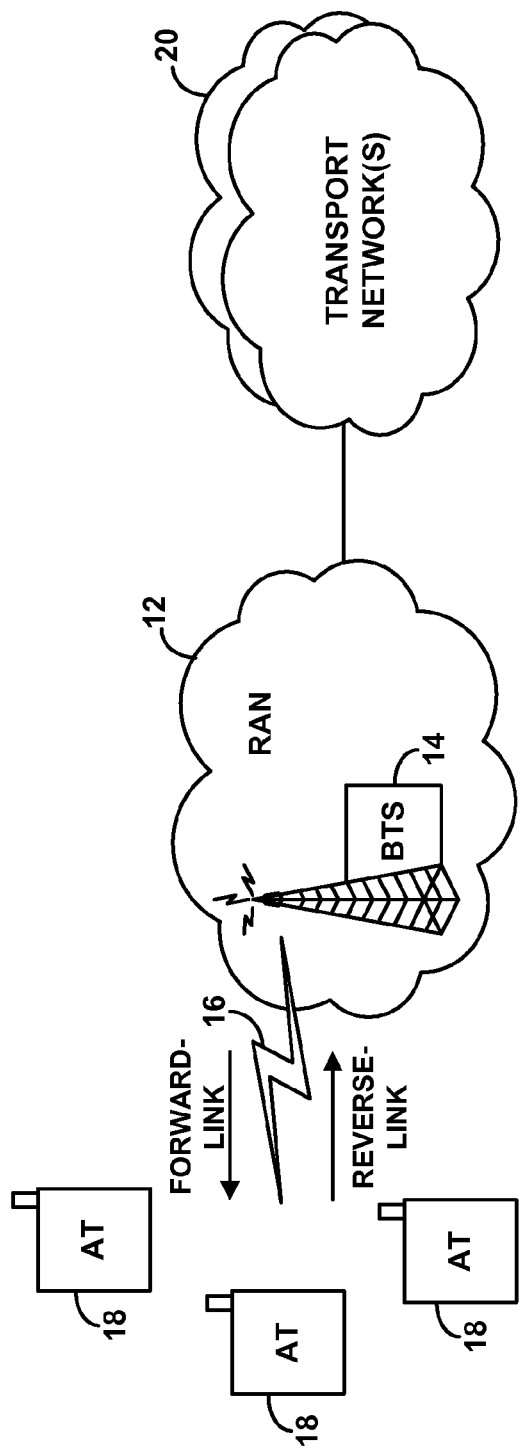
FIG. 1 is a simplified block diagram of a wireless communication system in which the present method can be implemented.

Referring to the drawings, as noted above, FIG. 1 is a simplified block diagram of a wireless communication system in which the present method can be implemented. It should be understood that this and other arrangements described herein are set forth only as examples. As such, those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

FIG. 1 depicts the example communication system as including at its core a RAN 12 having a base station 14 that radiates to define a wireless air interface 16 through which the base station may communicate with one or more served access terminals 18. RAN 12 then provides connectivity with one or more transport networks 20, such as the public switched telephone network (PSTN) or the Internet for instance. With this arrangement, an access terminal 18 that is positioned within coverage of the base station and that is suitably equipped may engage in air interface communication with the base station and may thereby communicate with remote entities on the transport network(s) and/or with other access terminals served by the RAN.

Figure 2:
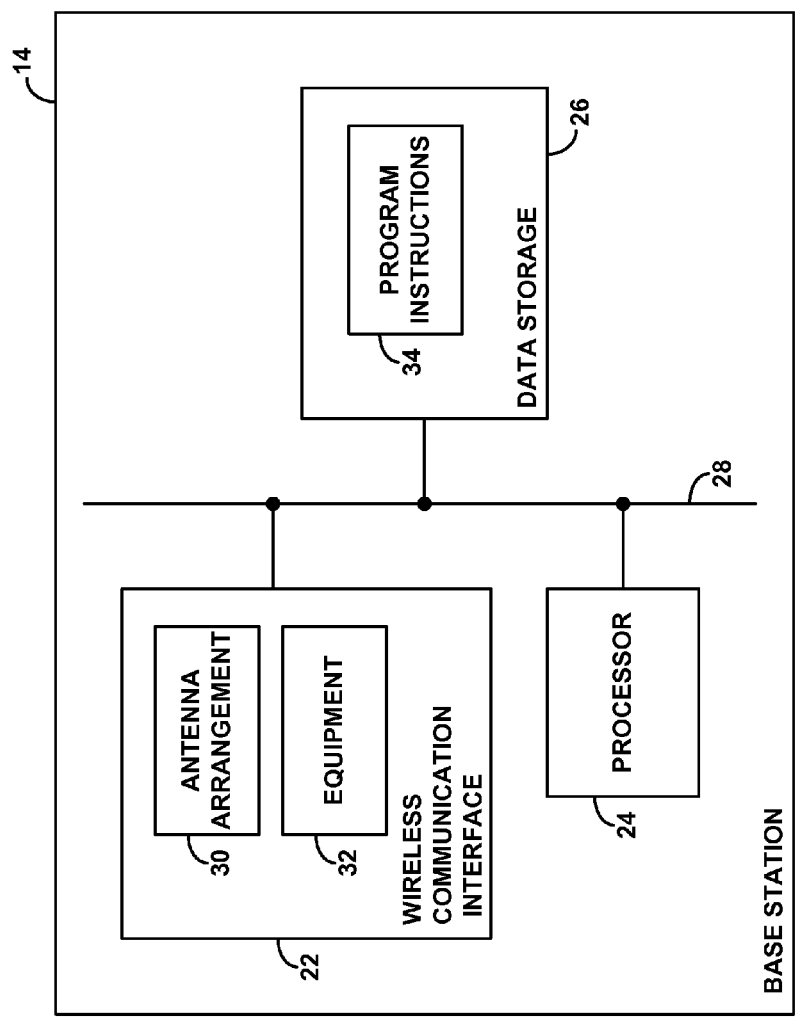
FIG. 2 is a simplified block diagram of a base station operable in the arrangement of FIG. 1.

FIG. 2 is next a simplified block diagram of a representative base station 14, such as a base transceiver station, access node, access point, Node-B, or eNodeB, for instance (whether macro, femto or the like), illustrating some of the components that can be included in such an entity. As shown in FIG. 2, the representative base station may include a wireless communication interface 22, a processor 24, and data storage 26, all of which may be coupled together by a system bus, network or other connection mechanism 28.

As shown, wireless communication interface 22 may comprise an antenna arrangement 30, which may be tower mounted, and associated components such as a cell site modem for engaging in air interface communication with access terminals 18, such as to transmit data and control information to the access terminals and receive data and control information from the access terminals.

Processor 24 may then comprise one or more general purpose processors (e.g., microprocessors) and/or special-purpose processors (e.g., digital signal processors and/or application specific integrated circuits) and may be integrated in whole or in part with the wireless communication interface. And data storage 26 may comprise one or more volatile and/or non-volatile storage components and may be integrated in whole or in part with processor 24.

As shown, data storage 26 may hold program instructions 34, which may be executable by processor 24 to carry out various base station or RAN functions described herein. For instance, in accordance with the program instructions, the processor may function to monitor forward-link timeslot utilization and, responsive to determining that the forward-link timeslot utilization is threshold high, to cause the base station to transmit via interface 22 to access terminals 18 a control signal that causes the access terminals to increase their ACK transmission power while reducing or maintaining at a default level their NAK transmission power.

As such, the processor 24 programmed with instructions 34 may define part or all of a controller for controlling operation of the base station 14. Alternatively or additionally, however, such control functionality could be provided external to the base station 14, in another RAN entity such as a radio network controller (RNC), base station controller (BSC), for instance, which could be communicatively linked with the base station and could serve to control aspects of base station operation and RAN operation generally.

Figure 3:
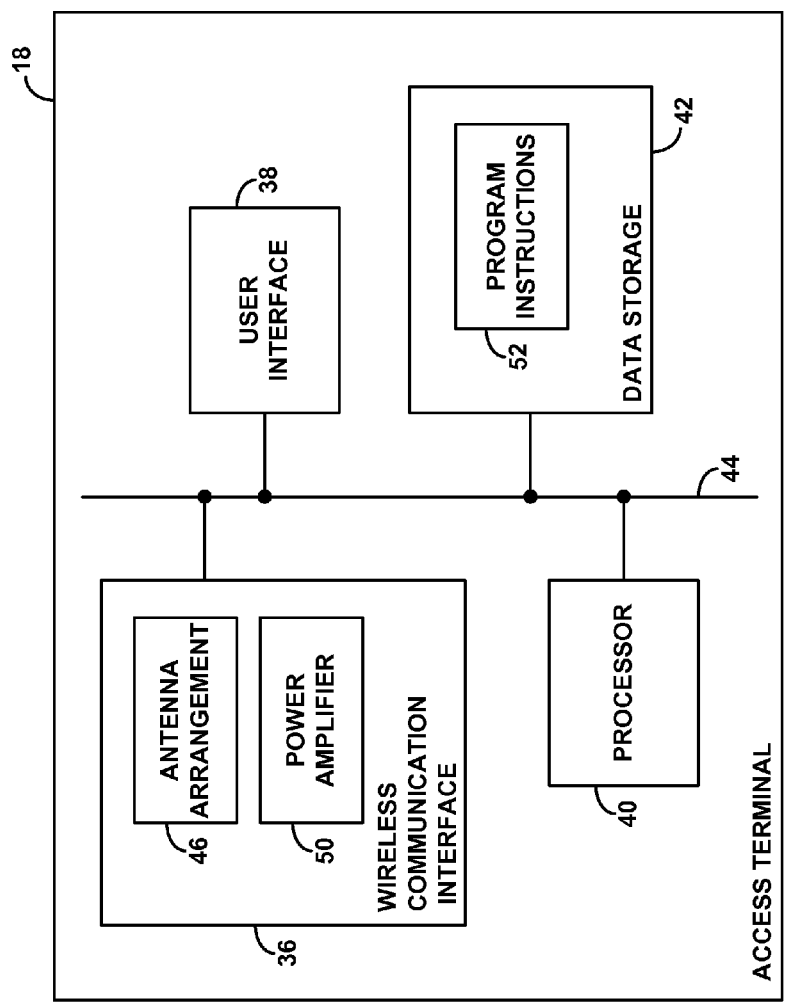
FIG. 3 is a simplified block diagram of an access terminal operable in the arrangement of FIG. 1.

FIG. 3 is next a simplified block diagram of a representative access terminal 18 (also possibly referred to as user equipment, a mobile station, a wireless communication device, or the like), such as a cellular telephone, wirelessly equipped tablet or personal computer, embedded wireless communication module, for instance, illustrating some of the components that can be included in such a device. As shown, the representative access terminal may include a wireless communication interface 36, a user interface 38, a processor 40, and data storage 42, all of which may be coupled together by a system bus, network, or other connection mechanism 44.

Wireless communication interface 36 may comprise an antenna arrangement 46 and associated components such as mobile station modem for instance, for engaging in communication with serving base stations such as base station 14, such as to transmit data and control information to the base stations and to receive data and control information from the base stations. Further, wireless communication interface 36 may include or be interconnected with a variable amplifier 50 that controls the power of air interface transmissions via the antenna arrangement 46.

User interface 38 may then facilitate interaction with a user of the access terminal if applicable. As such, the user interface may include output components such as a display screen, loudspeaker, and headphone jack, and input components such as a keypad, a touch-sensitive screen, and a camera.

Processor 40 may then comprise one or more general purpose processors and/or special-purpose processors and may be integrated in whole or in part with wireless communication interface 36. And data storage 42 may comprise one or more volatile and/or non-volatile storage components and may be integrated in whole or in part with processor 40.

As shown, data storage 42 may hold program instructions 52, which may be executable by processor 40 to carry out various access terminal functions described herein. For instance, in accordance with the program instructions, processor 40 may function to evaluate data transmissions from base station 14, to transmit hybrid-ARQ signaling to the base station, to receive control signals from the base station, and to responsively cause amplifier to vary transmission power of particular hybrid-ARQ messages such as ACKs for instance.

In practice, the RAN 12 and access terminals 18 may be arranged to communicate with each other over the air interface 16 according to one or more agreed air interface protocols, examples of which include Code Division Multiple Access (CDMA, e.g., 1xRTT or 1xEV-DO), Long Term Evolution (LTE), Wireless Interoperability for Microwave Access (WiMAX), IDEN, GSM, GPRS, UTMS, EDGE, MMDS, WIFI, BLUETOOTH, and other protocols now known or later developed.

As shown in FIG. 1, the air interface defines a forward-link 22 that carries wireless communications from the RAN to the access terminals and a reverse-link 24 that carries wireless communications from the access terminals to the RAN. Depending on the protocol, these links may be structured in various ways. At a high level, for instance, the base station 14 may provide service on one or more frequency channels or bands, with forward-link communications occupying one band and reverse-link communications occupying another band. Alternatively, forward-link and reverse-link communications may be carried out on a common frequency band and may be differentiated through time division multiplexing and/or other techniques.

Figure 4:
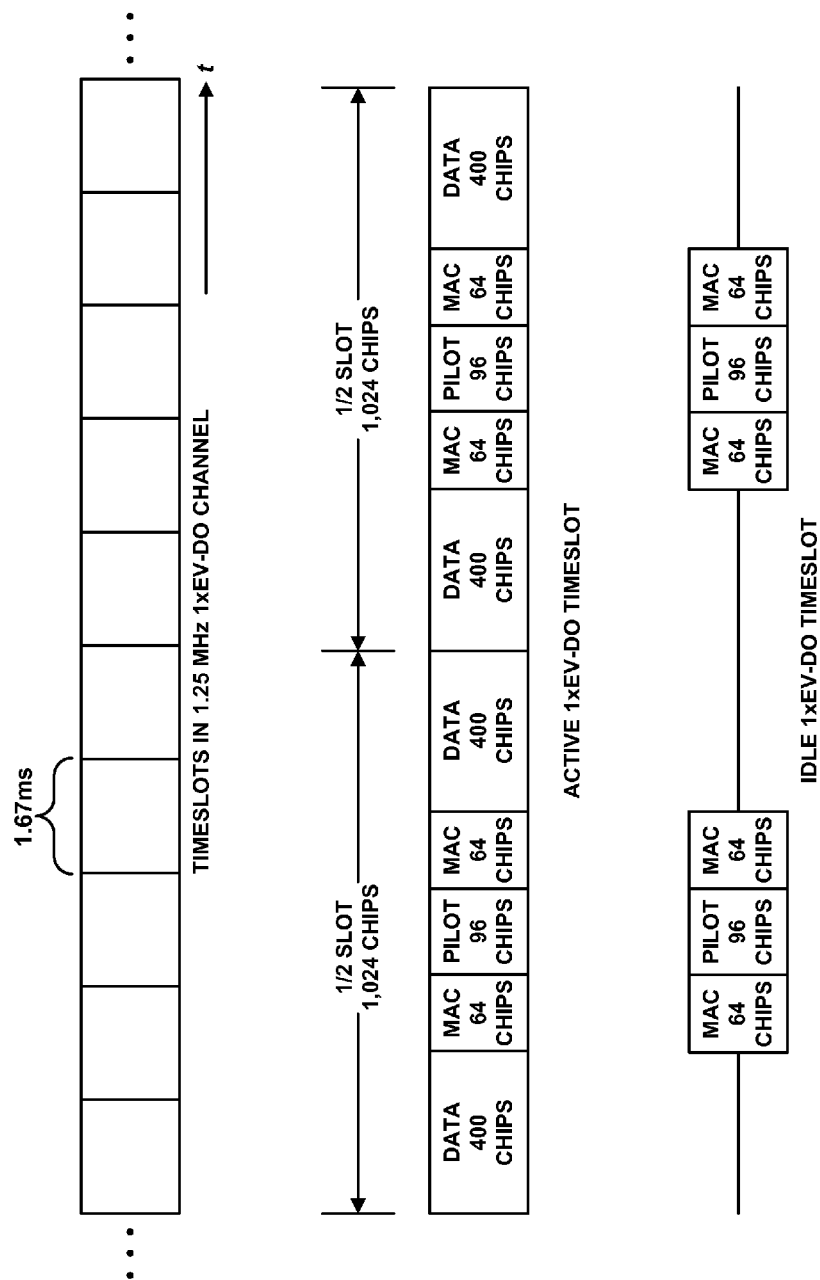
FIG. 4 is a depiction of forward-link timeslots in an example implementation.
Figure 5B:
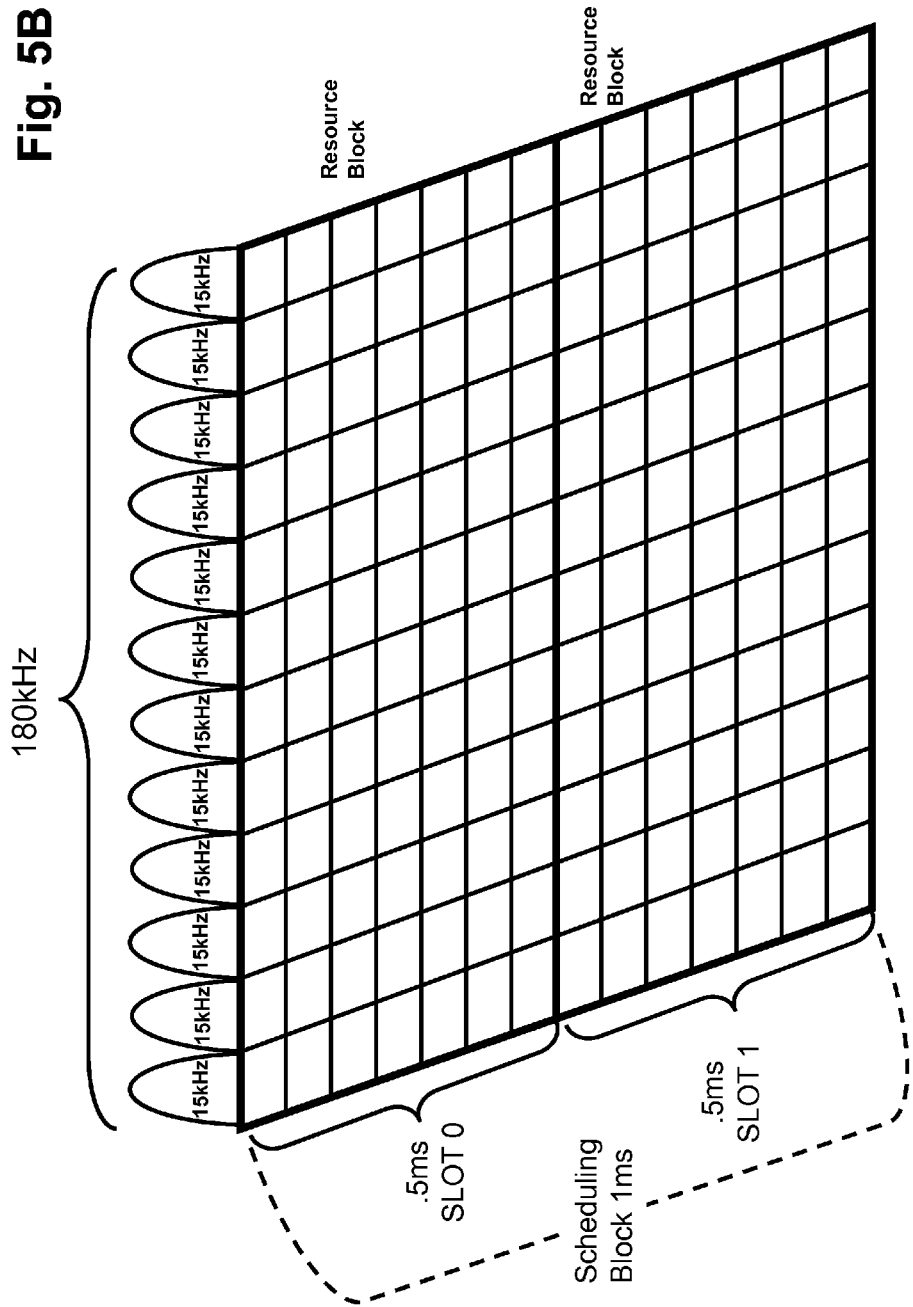
FIG. 5 (parts A and B) is a depiction of forward-link timeslots in another example implementation.

As noted above, the forward-link may be divided over time into a sequence of timeslots for carrying data such as bearer traffic and/or control signaling (among perhaps other segments of time set aside for other purposes). In practice, these timeslots may be defined in various ways, and thus the determination of the extent to which the timeslots are utilized may take various forms. FIGS. 4 and 5 depict two example timeslot arrangements, without limitation.

FIG. 4 depicts an example timeslot arrangement according to CDMA 1xEV-DO (as defined by the cdma2000 High Rate Packet Data standard, IS-856, for instance). According to 1xEV-DO, a forward-link channel is allocated 1.25 MHz of bandwidth and is direct-sequence spread at 1.2288 megachips per second, defining timeslots of length 2048 chips (1.67 milliseconds). As illustrated, each timeslot is divided into two half slots of 1024 chips each, with each half slot then being time-division multiplexed into a 400-chip data channel (traffic channel and control channel), a 64-chip Media Access Control (MAC) channel, a 96-chip pilot channel, another 64-chip MAC channel, and another 400-chip data channel.

With this arrangement, a timeslot may be considered to be "active" and thus utilized if the timeslot carries traffic-channel or control-channel data and thus effectively includes the data-channel segments. Whereas, a timeslot may be considered "idle" and thus not-utilized if the timeslot carries no traffic-channel or control-channel data and thus effectively does not include any data-channel segments (notwithstanding the fact that the timeslot may still include overhead data such as the pilot channel and MAC channel). In practice, when transmitting in idle timeslots, the RAN may pad the data-channel segments with data such as all zeros, but that padding data is not considered to be relevant bearer traffic or control channel data and thus does not change the fact that the timeslot is idle and thus not utilized.

Under 1xEV-DO, the forward-link may thus be considered to define a continuum of 1.67 millisecond timeslots, each of which may be considered to be utilized or not. Consequently, over a given period of time or on a sliding window basis for instance, the 1xEV-DO forward-link may be considered to have a timeslot utilization defined as a measure of the extent to which the forward-link timeslots are utilized, such as a ratio of the number of "active" timeslots in that period to the total number of timeslots in that period for instance.

FIG. 5 (parts A and B) next depicts an example timeslot arrangement according to LTE (as defined by the $3^{rd}$ Generation Partnership Project (3GPP) for instance). In LTE, the forward-link may span a particular frequency bandwidth (such as 5 MHz, 10 MHz, or 20 MHz for instance) that is divided into sub-carriers of 15 kHz, and the forward-link may be divided over time into a sequence of 0.5 millisecond timeslots. In turn, every 0.5 millisecond timeslot may define a certain number of 12-subcarrier wide "resource blocks" across the frequency bandwidth (as many as would fit within the given frequency bandwidth). Each resource block may then be further divided over time into seven symbol segments of 71 microseconds each, with a certain number of the symbol segments typically being set aside to carry control information and the remainder being set aside to carry bearer traffic.

With this arrangement, the resource blocks may themselves be considered to define individual timeslots across the frequency bandwidth. For instance, if 100 resource blocks fit within the available frequency bandwidth, the forward-link may be considered to have essentially 100 timeslots at a time across the frequency bandwidth. Thus, every 0.5 milliseconds may define another 100 timeslots (LTE resource blocks) across the frequency bandwidth.

As with 1xEV-DO, each of these timeslots (LTE resource blocks) may be considered to be utilized or not. For example, in one implementation, if a timeslot carries user-specific bearer traffic or user-specific control data, the timeslot may be considered to be utilized, whereas if the timeslot does not carry user-specific bearer traffic or user-specific control data, then the timeslot may be considered to be not utilized. And as another example, a timeslot may be considered to be not utilized if the timeslot merely contains certain fixed overhead signals or channels (such as a primary synchronization channel, a secondary synchronization channel, a physical broadcast channel, a reference signal, a physical control format indicator channel, a physical hybrid ARQ indicator channel, and/or a physical downlink control channel), but the timeslot may be considered to be utilized if the timeslot contains additional data, such as user-specific bearer data for instance. Other examples could be developed as well. Further, as with 1xEV-DO, the RAN may pad an unutilized portions of a timeslot with zeros or the like without the timeslot being utilized.

Under LTE, the forward-link may thus be considered to define a continuum of 0.5 millisecond groups of timeslots (resource blocks), with each timeslot being considered utilized or not. Consequently, over a given period of time or on a sliding window basis for instance, the LTE forward-link may be considered to have a timeslot utilization defined as a measure of the extent to which these forward-link timeslots are utilized, such as a ratio of the number of resource blocks carrying bearer traffic in that period to the total number of resource blocks in that period for instance.

In general, with these or other air interface protocols, the RAN (e.g., base station) may be arranged to schedule use of timeslots on the forward-link. For instance, as the RAN receives data to transmit to an access terminal, the RAN may buffer the data and may then allocate particular upcoming timeslots for use to carry the data and notify the access terminal which timeslots will be allocated for that purpose. Alternatively or additionally, the RAN may allocate timeslots on the fly for transmission of data to a particular access terminal and may label the timeslots as being for that access terminal by designating the access terminal's identifier (e.g., MAC address) in a header segment of each timeslot for instance. Other arrangements are possible as well.

Note also that recent versions of 1xEV-DO, as well as LTE, define the reverse-link in much the same way as the forward-link. Further, in both protocols, the RAN may likewise take charge of allocating reverse-link timeslots for use to transmit bearer data. Thus, if the access terminal has a packet data to transmit, the access terminal may engage in signaling communication with the RAN to request the RAN to allocate reverse-link timeslots to carry that data, and the access terminal may then transmit the data in the allocated reverse-link timeslots.

Both 1xEV-DO and LTE may also support a hybrid-ARQ process such as that described above. In practice, for instance, when a RAN operating according to either protocol has a data packet (essentially any chunk of data) to transfer to an access terminal, the RAN may attempt transmission of the packet to the access terminal in one or more forward-link timeslots. If the access terminal successfully receives the packet, the access terminal may then transmit an ACK to the RAN on the reverse-link. However, if the access terminal does not successfully receive the packet (e.g., cannot fully uncover or decode it), the access terminal may transmit a NAK to the RAN, and the RAN may then engage in a next transmission attempt possibly together with certain error correction coding, in one or more additional forward-link timeslots. The air interface protocol may define a reverse-link hybrid-ARQ channel (e.g., time division multiplexed with other reverse-link channels, such as a portion of each reverse link 1xEV-DO timeslot, or a portion of each reverse link LTE physical uplink control channel (PUCCH)) for carrying these ACK and NAK messages or may provide another mechanism for transmission of these messages.

As noted above, the present method helps to minimize the likelihood that the RAN would fail to receive an ACK transmitted by an access terminal, particularly in a situation where the forward-link timeslot utilization is high. By helping to ensure that the RAN receives ACK transmissions when the forward-link timeslot utilization is high, the method may help to avoid unnecessary re-transmissions by the RAN and thus wasteful use of scare forward-link timeslots.

To help ensure successful receipt of ACK transmissions when the forward-link timeslot utilization is high, the RAN may transmit to the access terminal a control signal that will cause the access terminal to increase its ACK transmission power. Thus, in practice, the RAN may regularly monitor the forward-link timeslot utilization and, upon detecting that the timeslot utilization is at least as high as a predetermined threshold level, the RAN may then transmit such a control signal. The RAN may unicast the control signal to one or more particular access terminals, such as access terminals currently having active data connections with the RAN, or the RAN may more generally broadcast the control signal in an overhead message for receipt by any access terminals monitoring broadcast channels of the RAN.

An access terminal that receives the control signal from the RAN may respond to at least the control signal by increasing its ACK transmission power. (In 1xEV-DO and LTE, for instance, the access terminal may temporarily increase the power of transmission in the reverse link HARQ channel for purposes of that ACK transmission, using known power adjustment techniques.) Optimally, the resulting increased ACK transmission power would be higher than the transmission power that the access terminal uses for other reverse-link transmissions, such as for NAK transmissions for instance. For instance, if the access terminal normally transmits ACKs and NAKs at the same transmission power (perhaps a default power level dynamically set through power control signaling with the RAN), the access terminal may respond to the control signal from the RAN by increasing its ACK transmission power while maintaining its NAK transmission power at the default level. Consequently, for each packet transmission attempt from the RAN, if the access terminal does not successfully receive the packet, the access terminal may transmit a NAK to the RAN at the default power level, whereas if the access terminal successfully receives the packet, the access terminal may transmit an ACK to the RAN at the increased transmission power level.

Increasing ACK transmission power on the reverse-link may increase the signal-to-noise ratio of ACK transmissions and thus help to ensure that ACKs successfully reach the RAN. Consequently, increasing ACK transmission power may help to avoid unnecessary retransmission of packets that were successfully received on the forward-link, and thus wasteful use of scarce forward-link timeslots.

On the other hand, increasing ACK transmission power on the reverse-link may also raise the reverse-link noise and thereby impact other transmissions on the reverse link, by decreasing the signal-to-noise ratio of those other transmissions. If the level of noise on the reverse-link is relatively low in the first place, this may not pose much of an issue. However, if the level of noise on the reverse-link is particularly high, this added noise may pose an issue.

To account for this, when the RAN causes an access terminal to increase its ACK transmission power in accordance with the present method, the RAN may also cause the access terminal to decrease its NAK transmission power if the reverse-link noise level is threshold high. To accomplish this in practice, the RAN may regularly monitor the level of noise on the reverse-link (e.g., the reverse noise rise, i.e., reverse link noise above a baseline noise floor), and the RAN may compare the level of reverse-link noise with a defined threshold level, to determine if the reverse-link noise is threshold high. When the RAN then causes an access terminal to increase its ACK transmission power (e.g., by 3 dB or some other preset or configurable amount), the RAN may also cause the access terminal to decrease its NAK transmission power (e.g., by 3 dB or some other preset or configurable amount) in response to the RAN determining that the reverse-link noise is threshold high.

Figure 6:
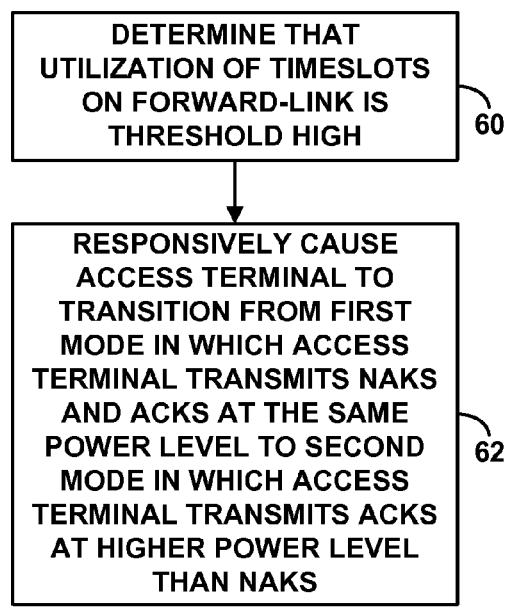
FIG. 6 is a flow chart depicting functions that can be carried out in accordance with the present method.

FIG. 6 is next a flow chart depicting functions that can be carried out in accordance with the present method. As noted above, the method may be carried out in a wireless communication system in which a RAN serves an access terminal over an air interface, with the air interface defining a forward-link having timeslots that carry data packets from the RAN to the access terminal, and a reverse-link that carries hybrid-ARQ messaging, such as NAKs and ACKs, from the access terminal to the RAN. Further, in a scenario where the RAN radiates to define multiple coverage areas (e.g., cell sectors) and/or multiple frequency channels in a given coverage area, the method may be carried out with respect to a particular coverage area and/or a particular frequency channel.

As shown in FIG. 6, at block 60, the method may involve the RAN making a determination that utilization of the timeslots on the forward-link is threshold high. To facilitate this in practice, the RAN (e.g., base station) may keep track of the number of forward-link timeslots that are utilized over time, such as on a sliding window basis, and the RAN may compute as the timeslot utilization a ratio of the number P of utilized timeslots to the total number N of timeslots. The RAN may then determine whether that ratio is at least as high as a predetermined threshold value and, if so, may conclude that the forward-link timeslot utilization is threshold high.

For this purpose, the RAN may consider past, present, and/or future timeslot utilization. For instance, the RAN may determine how many of the past N timeslots were utilized and compute the ratio based on that determination. Alternatively or additionally, the RAN may determine how many of the next upcoming N timeslots are scheduled to be utilized and compute the ratio based on that determination. Yet further, the RAN may also determine how many current timeslots are utilized and may compute the ratio based on that determination.

At block 62, the method may then involve the RAN responding to at least the determination that the forward-link timeslot utilization is threshold high by causing the access terminal to transition from (i) a first mode in which the access terminal transmits the NAKs and ACKs at the same power level to (ii) a second mode in which the access terminal transmits the ACKs at a higher power level than the NAKs. For example, the RAN may transmit on the forward-link to the access terminal a control command in response to which the access terminal is arranged to transition from the first mode to the second mode, such as by increasing its ACK transmission power from a default ACK transmission power level up to an increased ACK transmission power level.

In practice, although not shown in FIG. 6, the method may also involve the RAN subsequently making a determination that utilization of the timeslots on the forward-link is no longer threshold high, and responding to at least that determination by causing the access terminal to transition from the second mode back to the first mode. In practice, for instance, the RAN may continue to monitor the forward-link timeslot utilization and, upon determining that the timeslot utilization is no longer at least as high as the predetermined threshold value, the RAN may then transmit on the forward-link to the access terminal a control command in response to which the access terminal is arranged to transition from the second mode back to the first mode.

Furthermore, as discussed above, but also not shown in FIG. 6, the method may also involve the RAN making a determination that noise on the reverse-link is threshold high, and the RAN responding to at least that determination by causing the access terminal to reduce transmission power at which the access terminal transmits the NAKs from a default NAK transmission power level down to a decreased NAK transmission power level. Thus, in practice, the RAN may respond to detecting threshold forward-link timeslot utilization and high reverse-link noise by transmitting on the forward-link to the access terminal one or more control commands that cause the access terminal to increase its ACK transmission power and to decrease its NAK transmission power.

Figure 7:
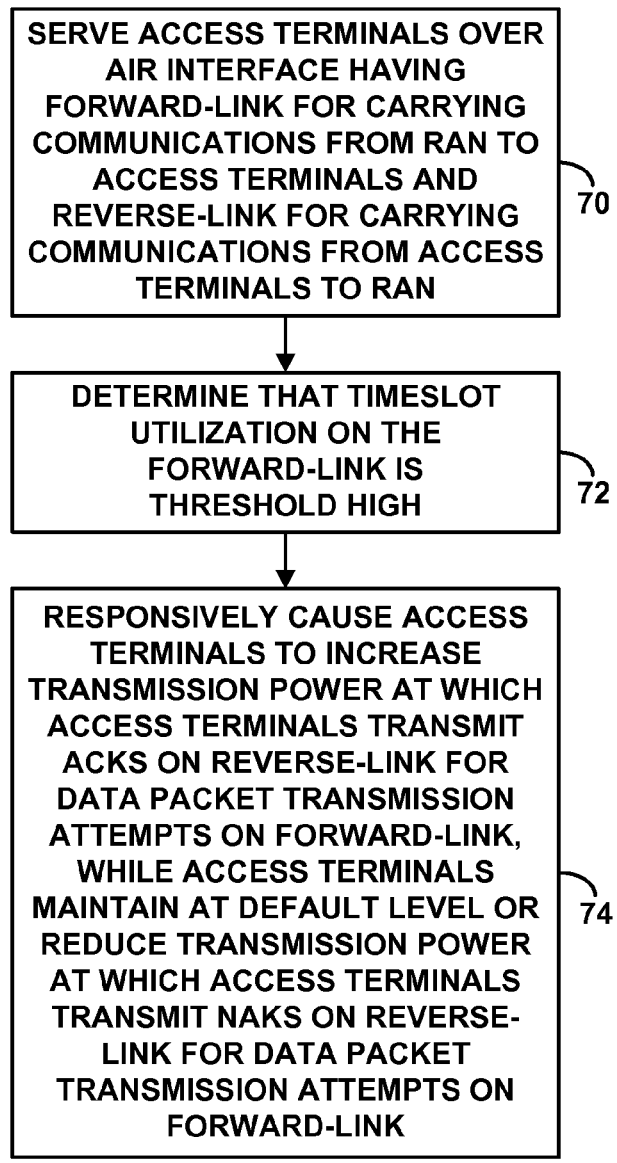
FIG. 7 is another flow chart depicting functions that can be carried out in accordance with the present method.

FIG. 7 is next another flow chart depicting functions that can be carried out in accordance with the present method. As shown in FIG. 7, at block 70, the method may involve a RAN serving access terminals over an air interface having a forward-link for carrying communications from the RAN to the access terminals and a reverse-link for carrying communications from the access terminals to the RAN. Serving access terminals may involve engaging in communication with the access terminals over the air interface, and perhaps further having the access terminals be registered for service with the RAN and be in an active data connection or data session with the RAN.

At block 72, the method may then involve the RAN making a determination that timeslot utilization on the forward-link is threshold high. This function can be carried out in the manner described above for instance. Further, this can occur while the RAN is serving the access terminals, as a background process for instance.

At block 74, the method may then involve, in response to at least making the determination that the timeslot utilization on the forward-link is threshold high, the RAN causing the access terminals to increase transmission power at which the access terminals transmit ACKs on the reverse-link for data packet transmission attempts on the forward-link, while the access terminals maintain at a default level or reduce transmission power at which the access terminals transmit NAKs on the reverse-link for data packet transmission attempts on the forward-link. This too can be done in the manner discussed above for instance.

Still further, although again not shown in the figure, the method may involve the RAN making a determination that utilization of timeslots on the forward-link is no longer threshold high and, responsive to that determination, causing the access terminals to revert to a default transmission power level for transmission of ACKs on the reverse-link for data packet transmission attempts on the forward link. And the method may additionally involve the RAN making a determination that noise on the reverse-link is threshold high and, in response to that determination, the RAN causing the access terminals to reduce the transmission power at which the access terminals transmit NAKs on the reverse-link for data packet transmission attempts on the forward link.

Exemplary embodiments have been described above. It should be understood, however, that variations from these embodiments are possible, while remaining within the true spirit and scope of the invention.

We claim:

1. In a wireless communication system in which a radio access network (RAN) serves an access terminal over an air interface, wherein the air interface defines a forward-link having timeslots that carry data packets from the RAN to the access terminal, and the air interface defines a reverse-link that carries hybrid-ARQ messaging from the access terminal to the RAN, the hybrid-ARQ messaging including, for forward-link data packet transmission attempts, negative acknowledgements (NAKs) and positive acknowledgements (ACKs), a method comprising:
the RAN making a determination that utilization of the timeslots on the forward-link is threshold high, wherein making the determination that utilization of the timeslots on the forward-link is threshold high comprises detecting utilization of a threshold high extent of timeslots on the forward-link; and
responsive to at least the determination, the RAN causing the access terminal to transition from (i) a first mode in which the access terminal transmits the NAKs and ACKs at the same power level to (ii) a second mode in which the access terminal transmits the ACKs at a higher power level than the NAKs.

2. The method of claim 1, wherein detecting utilization of the threshold high extent of timeslots on the forward-link comprises:
for a given period of time spanning N timeslots on the forward-link, (a) determining a count P of timeslots carrying at least one of bearer data and control data and (b) determining as the utilization a ratio of P to N; and
determining that the determined ratio is at least as high as a predetermined threshold value.

3. The method of claim 2, wherein the N timeslots of the given period of time encompass one or more past timeslots.

4. The method of claim 2, wherein the N timeslots of the given period of time encompass one or more upcoming timeslots.

5. The method of claim 1, wherein causing the access terminal to transition from the first mode to the second mode comprises transmitting on the forward-link a control command in response to which the access terminal is arranged to transition from the first mode to the second mode.

6. The method of claim 1, wherein the determination is a first determination, the method further comprising:
the RAN making a second determination that utilization of the timeslots on the forward-link is no longer threshold high; and
responsive to at least the second determination, the RAN causing the access terminal to transition from the second mode back to the first mode.

7. The method of claim 1, wherein causing the access terminal to transition from the first mode to the second mode comprises causing the access terminal to increase transmission power at which the access terminal transmits the ACKs from a default ACK transmission power level up to an increased ACK transmission power level.

8. The method of claim 7, wherein the determination is a first determination, the method further comprising:
the RAN making a second determination that noise on the reverse-link is threshold high; and
responsive to at least the second determination, the RAN causing the access terminal to reduce transmission power at which the access terminal transmits the NAKs from a default NAK transmission power level down to a decreased NAK transmission power level.

9. The method of claim 8, wherein making the second determination that noise on the reverse-link is threshold high comprises evaluating reverse-noise-rise (RNR) of the reverse-link and determining that the RNR is threshold high.

10. A method comprising:
a radio access network (RAN) serving access terminals over an air interface having a forward-link for carrying communications from the RAN to the access terminals and a reverse-link for carrying communications from the access terminals to the RAN;
the RAN making a determination that timeslot utilization on the forward-link is threshold high, wherein making the determination that timeslot utilization on the forward-link is threshold high comprises detecting utilization of a threshold high extent of timeslots on the forward-link; and
responsive to at least the determination, the RAN causing the access terminals to increase transmission power at which the access terminals transmit positive acknowledgements (ACKs) on the reverse-link for data packet transmission attempts on the forward-link, while the access terminals maintain at a default level or reduce transmission power at which the access terminals transmit negative acknowledgements (NAKs) on the reverse-link for data packet transmission attempts on the forward-link.

11. The method of claim 10, wherein detecting utilization of the threshold high extent of timeslots on the forward-link comprises:
for a given period of time spanning N timeslots on the forward-link, (a) determining a count P timeslots carrying at least one of bearer data and control data and (b) determining as the utilization a ratio of P to N; and
determining that the determined ratio is at least as high as a predetermined threshold value.

12. The method of claim 11, wherein the N timeslots of the given period of time encompass one or more past timeslots.

13. The method of claim 11, wherein the N timeslots of the given period of time encompass one or more upcoming timeslots.

14. The method of claim 10, wherein the determination is a first determination, the method further comprising:
the RAN making a second determination that utilization of the timeslots on the forward-link is no longer threshold high; and responsive to at least the second determination, the RAN causing the access terminals to revert to a default transmission power level the transmission power at which the access terminals transmit ACKs on the reverse-link for data packet transmission attempts on the forward-link.

15. The method of claim 10, wherein the determination is a first determination, the method further comprising:
   the RAN making a second determination that noise on the reverse-link is threshold high; and
   responsive to at least the second determination, the RAN causing the access terminals to reduce the transmission power at which the access terminals transmit the NAKs on the reverse-link for data packet transmission attempts on the forward-link.

16. The method of claim 15, wherein making the second determination that noise on the reverse-link is threshold high comprises evaluating reverse-noise-rise (RNR) of the reverse-link and determining that the RNR is threshold high.

17. The method of claim 10, wherein the ACKs and NAKs are for hybrid-ARQ.

18. A radio access system comprising:
   a base station arranged to communicate with access terminals over an air interface defining a forward-link for communications from the base station to the access terminals and a reverse link for communications from the access terminals to the base station; and
   a controller arranged to make a determination that timeslot utilization on the forward-link is threshold high and, responsive to at least the determination, to cause the base station to transmit to the access terminals a control signal that causes the access terminals to increase transmission power at which the access terminals transmit positive acknowledgements (ACKs) on the reverse-link to the base station for data packet transmission attempts from the base station, while the access terminals reduce or maintain at a default level transmission power at which the access terminals transmit negative acknowledgements (NAKs) on the reverse link to the base station for data packet transmission attempts from the base station,
   wherein making the determination that timeslot utilization on the forward-link is threshold high comprises detecting utilization of a threshold high extent of timeslots on the forward-link.

19. The radio access system of claim 18, wherein the controller is part of the base station.

20. The radio access system of claim 18, wherein the timeslots are Long Term Evolution resource blocks.

* * * * *